(12) United States Patent
Park et al.

(10) Patent No.: US 6,256,598 B1
(45) Date of Patent: Jul. 3, 2001

(54) METHOD AND SYSTEM FOR CREATING A CONTROL-FLOW STRUCTURE WHICH REPRESENTS CONTROL LOGIC, RECONFIGURABLE LOGIC CONTROLLER HAVING THE CONTROL LOGIC, METHOD FOR DESIGNING THE CONTROLLER AND METHOD FOR CHANGING ITS CONTROL LOGIC

(75) Inventors: Euisu Park; Dawn M. Tilbury; Pramod P. Khargonekar, all of Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/114,020

(22) Filed: Jul. 10, 1998

(51) Int. Cl.[7] ............................. G06F 7/60; G06F 101/00; G06F 17/10
(52) U.S. Cl. ................. 703/2; 703/1; 703/7; 700/95; 700/100
(58) Field of Search .................. 703/1, 2, 7; 700/61, 700/95, 100; 705/8

(56) References Cited

U.S. PATENT DOCUMENTS

| 5,257,363 | 10/1993 | Shapiro et al. | 703/13 |
|---|---|---|---|
| 5,291,427 | 3/1994 | Loyer et al. | 703/13 |

OTHER PUBLICATIONS

"Powertrain Machining Technology & Applications Conference", Proceedinsg, SME, Nov. 6–7, 1996.

"Real–Time Open Control Architecture and System Performance", by Yoram Koren, Zbigniew J. Pasek, A. Galip Ulsoy, Uri Benchetrit, Annals of the CIRP, vol. 45 (1996), pp. 1–4.

Kurapati et al., "Design of Sequence Controllers Using Petri Net Models", IEEE International Conference on Systems, Man and Cybernetics, pp. 3469–3474 Oct. 1995.

Zhou et al., "Control Logic Design with Petri Nets For Integrated Manufacturing Systems", IEEE International Conference on Systems, Man and Cybernetics, pp. 986–991 Oct. 1992.

Zhou et al., "A Comparison Relay Ladder Logic Programming and Petri Net Approach for Sequential Industrial Control Systems", Proceedings of the 4th IEEE Conference on Control Applications, pp. 748–753.

*Primary Examiner*—Kevin J. Teska
*Assistant Examiner*—Samuel Broda
(74) *Attorney, Agent, or Firm*—Brooks & Kushman P.C.

(57) ABSTRACT

Method and system for creating a control-flow structure which represents control logic for use in a manufacturing system based on the system's timing bar chart are described. A modular representation of the control logic is described. In the setting of a high volume transfer line, each station of the line is considered as a module and a simple method to generate a Petri net representation from the timing bar chart is described. Modified reduction rule and locality property are applied to compose the logic of a Petri net module. Using the well known properties of the marked graph which is one of the subclasses of Petri nets, the qualitative characteristics of the logic controller of the system such as liveness, boundedness (safeness) and recoverability can be verified. A live and safe marked graph can be directly transformed into Grafcet (which is one of the EC 1131-3 languages) and, using this Grafcet representation, a logic controller can be implemented directly. The reconfigurability properties of this approach to implementation of logic controllers is also described.

26 Claims, 11 Drawing Sheets

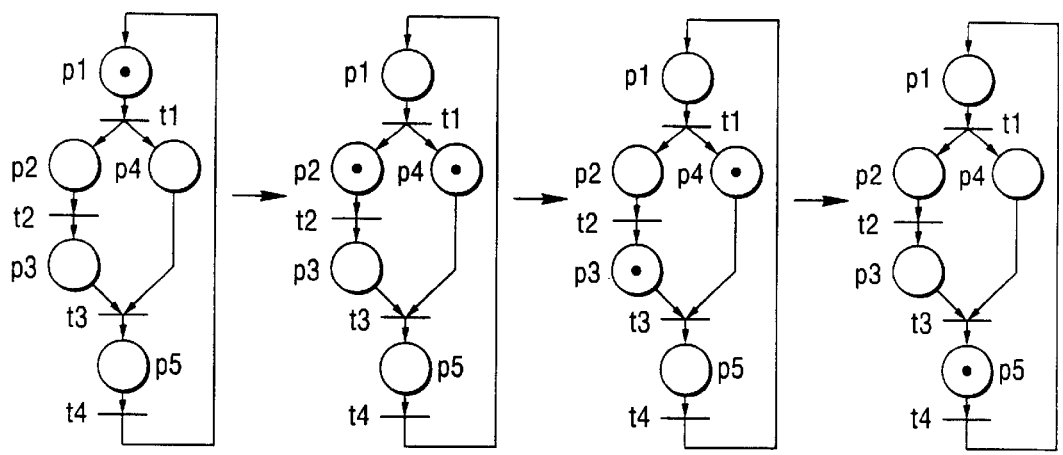
Fig. 3a　Fig. 3b　Fig. 3c　Fig. 3d
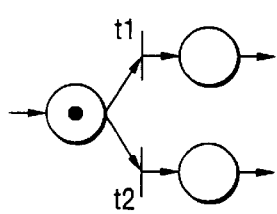 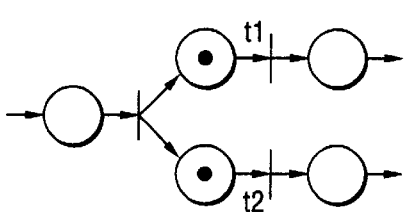 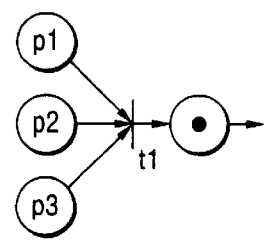
Fig. 4a　　　　Fig. 4b　　　　Fig. 4c
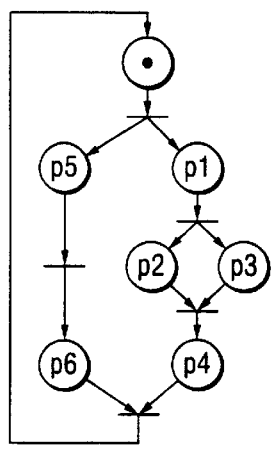 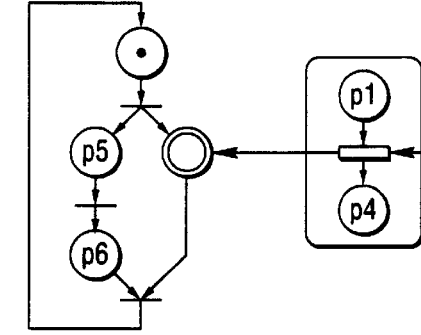
Fig. 5a　　Fig. 5b　Fig. 5c　Fig. 5d

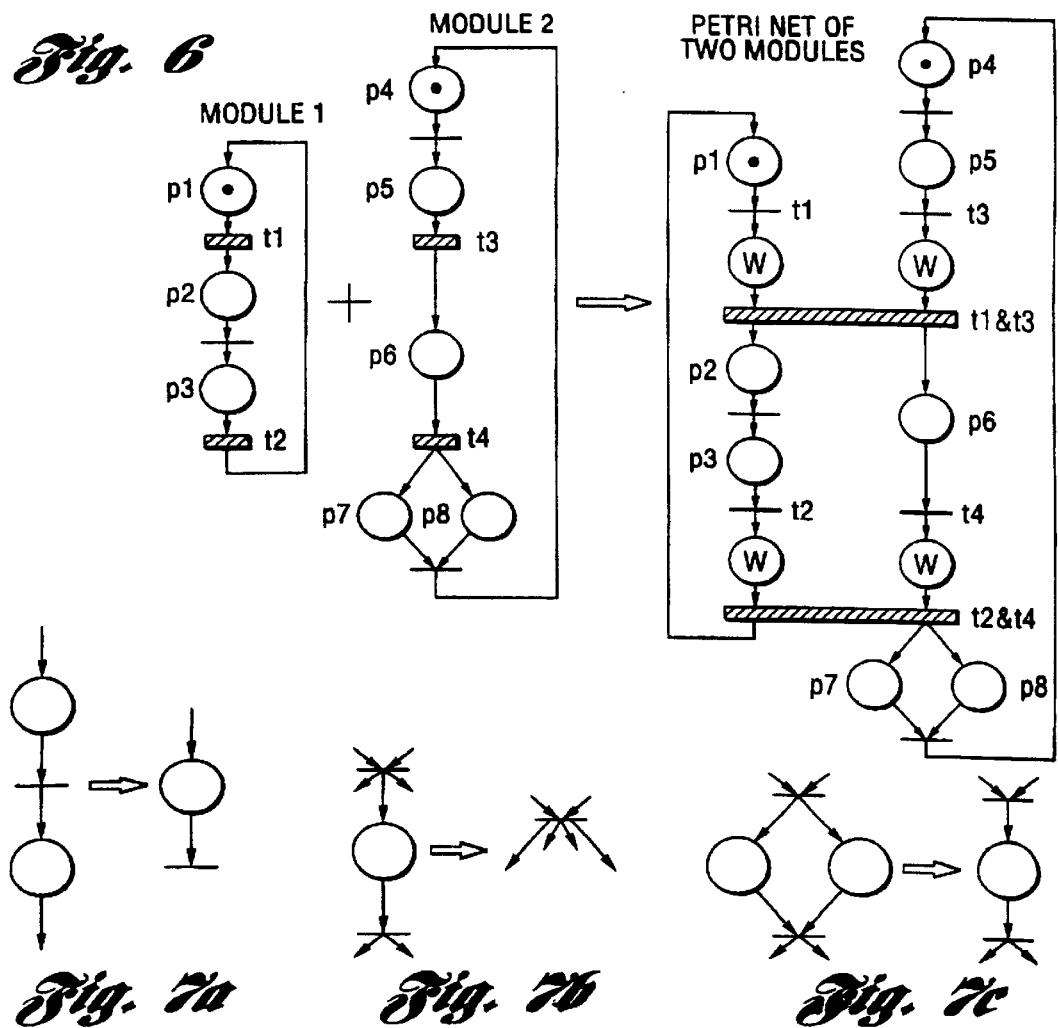
Fig. 6
Fig. 7a  Fig. 7b  Fig. 7c
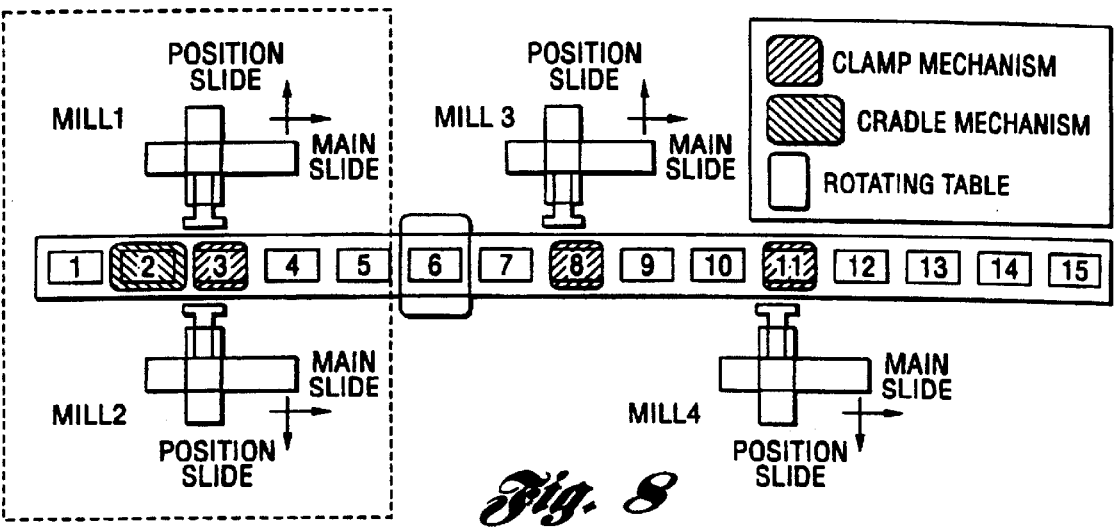
Fig. 8

| | OPERATION | GPM | SEC | Total: Cycle Time = 22.2 Seconds  1 2 3 4 5 6 7 8 9 10 11 12 13 14 15 16 17 18 19 20 21 22 |
|---|---|---|---|---|
| Transfer Bar Module | Cycle Load Automation | | | |
| | Raise Transfer (1st Lift) | 19.6 | 0.7 | |
| | Raise Transfer (2nd Lift) | 15.4 | 0.3 | |
| | Raise Transfer (3rd Lift) | 22.2 | 0.3 | |
| | Raise Transfer (4th Lift) | 63.1 | 0.3 | |
| | Advance Transfer | Servo | 2.5 | |
| | Lower Transfer (1st Lower) | 50.0 | 0.5 | |
| | Lower Transfer (2nd Lower) | 29.6 | 0.3 | |
| | Lower Transfer (3rd lower) | 20.5 | 0.3 | |
| | Lower Transfer (4th Lower) | 36.5 | 0.5 | |
| | Return Transfer | Servo | 2.5 | |
| Cradle Module | Advance Cradle (Mach. Pos.) | 2.9 | 1.0 | |
| | Return Cradle (Trans. Pos.) | 3.8 | 1.0 | |
| Clamp Module | Advance Clamp | 4.9 | 1.5 | |
| | Read Part Seated Air Checks | | 0.5 | |
| | Return Clamp | 6.5 | 1.5 | |
| Finish Mill LH Module | Rapid Advance Pos. Slide | 2.1 | 0.6 | |
| | Decel | | 0.9 | |
| | Feed Main Slide | Servo | 9.7 | |
| | Rapid Return Pos. Slide | 1.3 | 0.6 | |
| | Reset Main Slide | Servo | 9.0 | |
| Finish Mill RH Module | Rapid Advance Pos. Slide | Servo | 1.1 | |
| | Decel | Servo | 0.7 | |
| | 1st Feed Main Slide | Servo | 5.8 | |
| | Dwell | | 0.1 | |
| | Rapid Return Pos. Slide | Servo | 0.5 | |
| | Back Feed Pos. Slide | Servo | 0.7 | |
| | 2nd Feed Main Slide | Servo | 1.1 | |
| | 3rd Feed Main Slide | Servo | 0.2 | |
| | Back-Off Positioning Slide | Servo | 0.1 | |
| | Rapid Return Main Slide | Servo | 0.4 | |
| | Rapid Return Pos. Slide | Servo | 1.0 | |
| | Reset Main Slide | Servo | 2.9 | |

Fig. 9

| | OPERATION | GPM | SEC | Total: Cycle Time = 22.2 Seconds<br>1 2 3 4 5 6 7 8 9 10 11 12 13 14 15 16 17 18 19 20 21 22 |
|---|---|---|---|---|
| | Cycle Load Automation | | | |
| Transfer Bar Module | Raise Transfer (1st Lift) | 19.6 | 0.7 | |
| | Raise Transfer (2nd Lift) | 15.4 | 0.3 | |
| | Raise Transfer (3rd Lift) | 22.2 | 0.3 | |
| | Raise Transfer (4th Lift) | 63.1 | 0.3 | |
| | Advance Transfer | Servo | 2.5 | |
| | Lower Transfer (1st Lower) | 50.0 | 0.5 | |
| | Lower Transfer (2nd Lower) | 29.6 | 0.3 | |
| | Lower Transfer (3rd lower) | 20.5 | 0.3 | |
| | Lower Transfer (4th Lower) | 36.5 | 0.5 | |
| | Return Transfer | Servo | 2.5 | |
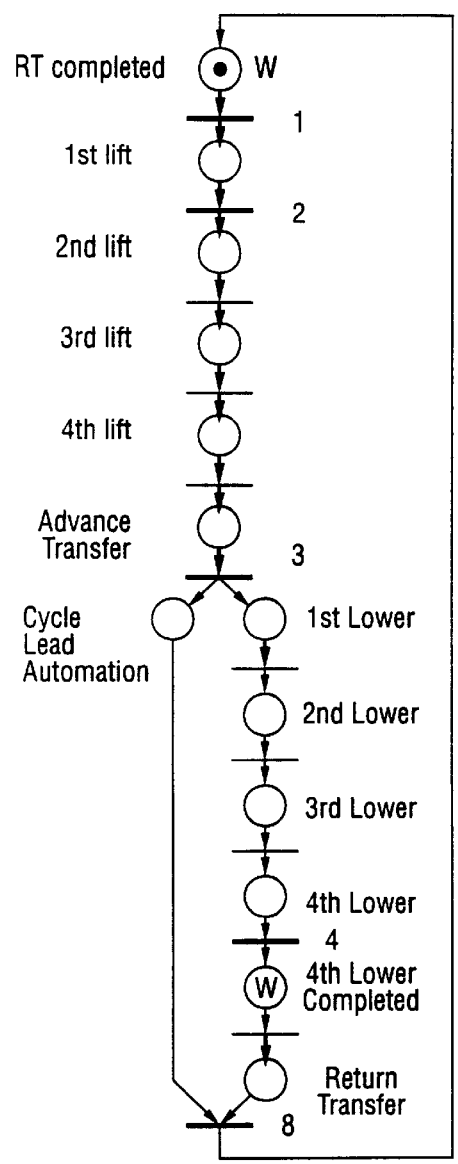
*Fig. 10a*
*Fig. 10b*
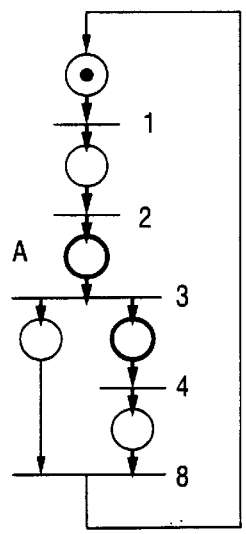
*Fig. 10c*

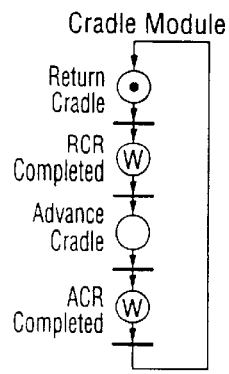
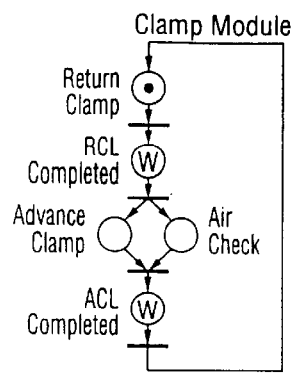
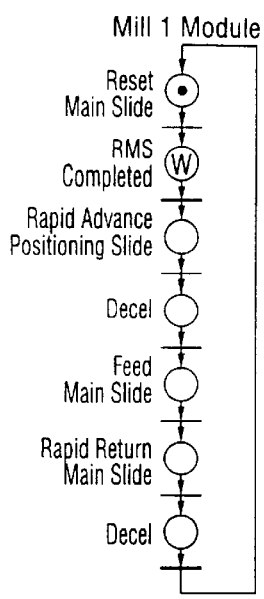
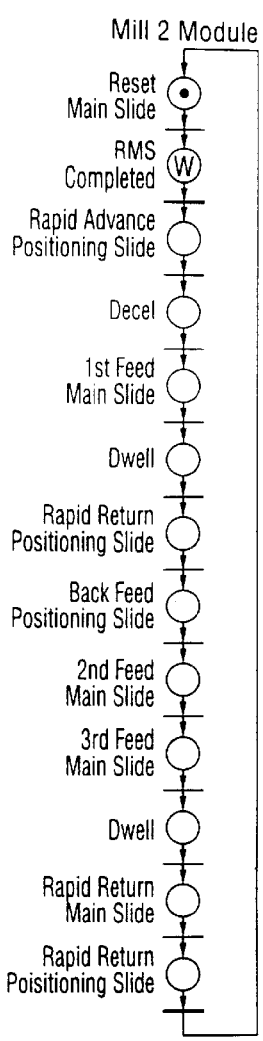
Fig. 11a   Fig. 11b   Fig. 11c   Fig. 11d
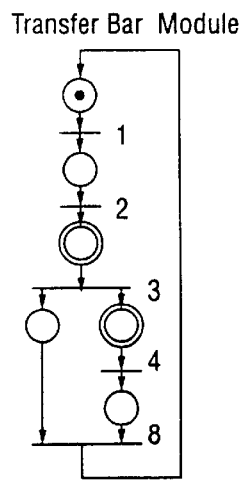
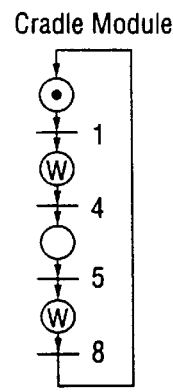
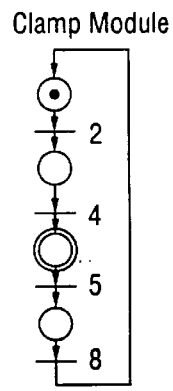
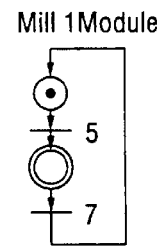
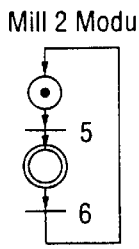
Fig. 12a   Fig. 12b   Fig. 12c   Fig. 12d   Fig. 12e

| Marked Graph | Grafcet |
|---|---|
| Simple Place ◯ | Simple Step ▢ |
| Initial Place ⊙ | Initial Step ⊡ |
| Simple Transition ┼ | Simple Transition ┼ |
| Synchronized Transition | Synchronized Transition |
| Macro Place ◎ | Macro Step |

METHOD AND SYSTEM FOR CREATING A CONTROL-FLOW STRUCTURE WHICH REPRESENTS CONTROL LOGIC, RECONFIGURABLE LOGIC CONTROLLER HAVING THE CONTROL LOGIC, METHOD FOR DESIGNING THE CONTROLLER AND METHOD FOR CHANGING ITS CONTROL LOGIC

CROSS-REFERENCE TO RELATED APPLICATIONS

This application is related to U.S. patent applications entitled "Reconfigurable Machine Tool" filed Dec. 23, 1997 and having U.S. Ser. No. 08/997,140, and U.S. patent application entitled "Reconfigurable Manufacturing System Having A Production Capacity, Method For Designing Same And Method For Changing Its Production Capacity" filed May 27, 1998 and having U.S. Ser. No. 09/085,562.

STATEMENT OF GOVERNMENT RIGHTS

This invention was at least partially made with Government support under NSF Contract No. EEC 9529125. The Government has certain rights to this invention.

TECHNICAL FIELD

This invention relates to methods and systems for creating control-flow structures, a reconfigurable logic controller and methods for designing and changing he control logic of same.

BACKGROUND ART

In many machining processes, several machines work together with the characteristics of synchronization, concurrency, and cyclic sequences. A logic controller is a discrete event supervisory system which controls parallel and synchronized sequences of elementary operations of each machine to achieve the goal of the machining system.

In other words, logic controllers are event-based systems whose purpose is to control the behavior of a process which is itself an event-based system. A manufacturing system with a logic controller is shown in FIG. 1. The machining system considered in FIG. 1 is a high volume transfer line. Generally, this kind of manufacturing system has several stations inside the system which work together to produce the desired part.

The inputs of the logic controller are signals which are generated by the sensors in each station, and the outputs are Boolean signals (on/off signals). The logic controller governs the sequence of each station and the events which occur in machining process specified by the control algorithm. Control engineers in the machine tool industry use a timing bar chart as a guide to program control algorithms for the logic controller.

An example of a timing bar chart is shown in FIG. 9. It has information about the sequence of each module in the system and the concurrencies of the whole process sequence. The causal dependencies of the sequences are represented using the time axis and the dotted arrows correlate the sequences which depend on each other. The timing information of each operation comes from the specifications of the servo control loops that govern the underlying continuous-time systems. From this information, the time for each operation can be calculated and used in the timing bar chart. The timing bar chart has all the information needed to describe the sequences for the process. In other words, it represents the specification of the operations for the desired process.

The programs for the logic controller for the system are generated manually from this timing bar chart and the hard wiring information. A problem with this procedure is that this is not a formal way to generate the control logic programs. Therefore, the initial programming of the system as well as the modification of the control logic due to minor change of the operations of the system is very difficult and time-consuming.

Petri nets have generally been considered as an analysis tool for event based systems which are concurrent, synchronized, and distributed. For example, the U.S. Pat. No. 5,257,363 to Shapiro et al. discloses a computer-aided generation of programs modeling complex systems using colored Petri nets. Also, the U.S. Pat. No. 5,291,427 to Loyer et al. discloses a method for assisting the development of a set of communicating automata wherein a development machine is supplied with a description of initial elementary Petri nets.

Petri nets enable the qualitative and quantitative analysis of an event-based system. One can check the correctness of the modeled system from the qualitative analysis and analyze the efficiency of the modeled system from the quantitative analysis. A Petri net is a mathematical formalism which has a simple graphical representation. Petri nets consist of two kinds of nodes: places which are represented by circles, and transitions, represented by bars. Nodes are connected by arcs. As a system's behavior can be described by its state and evolution rules, the dynamics of a Petri net are created by its marking and marking evolution rule. A marking assigns to each place a non-negative integer and the integer value is graphically represented by the number of tokens in each circle (place). The number of tokens at a place represents the local state of the place and the state of the whole system is defined by the collection of local states of the places. A Petri net and its evolution rule can be represented formally by the following definitions and a pictorial example for the evolutions of an ordinary Petri net is given in FIGS. 3a–3d.

In an initial marking of FIG. 3a, there is one token in p1. Transition t1 is enabled because all places leading to it are marked; it is the only transition enabled. After transition t1 fires, the marking becomes in FIG. 3b. Each place leading out of transition t1 gets a token. Now transition t2 is enabled (transition t3 cannot fire until both places p3, p4 are marked). If more than one transition is enabled at a time, the Petri net exhibits nondeterministic behavior. After transition t4 fires, the Petri net returns to its initial marking of FIG. 3a. The Petri net is said to be reversible.

Definition 1.

A Petri net is a four-tuple;

$$N=(P, T, F, W)$$

where:

P is a finite non-empty set of $n=|P|$ places, $P=\{p_1, p_2, \ldots P_n\}$

T is a finite non-empty set of $m=|T|$ transitions, $T=\{t_1, t_2, \ldots, t_m\}$ $F \subset (P \times T) \cup (T \times P)$ is the flow relation (set of directed arcs)

$W:F \rightarrow Z^+$ assigns a weight to each arc, $W=\{1, 2, 3, \ldots\}$.

Definition 2.

A Petri net is ordinary if all the arc weights are one.

Definition 3.

A marking M of a net N is the assignment of a non-negative integer to each place. It is a state-vector of the Petri net system which has dimension n.

Definition 4.

A Petri net with the given initial marking is denoted by $\langle N, M_0 \rangle$.

Definition 5.

A state or marking in a Petri net evolves according to the following transition (evolution) rules:

1. A transition t is said to be enabled if each input place p of t is marked with at least as many tokens as the weight of the arc joining them.
2. An enabled transition may or may not fire depending on whether or not the transition (event) actually takes place.
3. A firing of an enabled transition t removes $w(p,t)$ tokens from each input place p of t, and adds $w(t,p)$ tokens to each output place p of t.

Grafcet is a graphical programming language—originally developed by AFCET (Association Francais pour la Cybernetique Economique et Technique) in France and has become an international standard The Grafcet language represents the functions of an automation system as a sequence of steps and transitions—with directed flow lines connecting the two. It was specifically designed for sequential control problems where the steps are sequential or time dependent. Each step in a Grafcet sequence represents a stable situation in an automation process and has one or more actions associated with it—while a transition indicates the possibility of evolution from one step to the next. Boolean events are associated with each transition. Sequences may be linked together by a branch construct which may represent a conditional or a parallel flow of execution. A single Flow Line is used to link steps and transitions together to indicate the flow of execution. Double flow lines are used when two or more steps within a program must be synchronized.

IEC 1131 is a standard set down by the International Electrotechnical Commission that specifies the syntax and semantics of a unified suite of programming languages for programmable controllers. Part of the standard refers to Sequential Function Charts that is Grafcet-like in structure.

As previously mentioned, a major task in the design of machining systems is the design of logic controllers. As also described above, generally a machining system is composed of several stations and the operation of the system is governed by sequences of events within the stations as well as dependencies across the stations. In devising control algorithms for such a machining system, it is necessary to consider not only the event sequence of each station but also the correlated sequences of the entire system. Even though logic controllers are very important in the machining industry, there is not yet a standard integrated tool, which is sufficiently powerful, versatile and simple to use, and with which it is possible to carry out formal analysis of correctness besides the traditional approach of validation through simulation.

SUMMARY OF THE INVENTION

An object of the present invention is to provide a method and system for creating a control-flow structure, such as a graphical control structure (Sequential Function Chart (SFC)), for use in a manufacturing system having a plurality of stations or modules which is sufficiently powerful, versatile and simple to use and with which it is possible to carry out formal analysis of correctness besides the traditional approach of validation through simulation.

Another object of the present invention is to provide a reconfigurable logic controller having a control logic as well as methodologies for its systematic design and changing its control logic.

In carrying out the above objects and other objects of the present invention, a method is provided for creating a control-flow structure which represents control logic for use in a manufacturing system having a plurality of modules. The method includes the steps of providing a timing bar chart which describes the various sequential operations to be performed on a part by the modules of the system and generating a model of the sequential operations to be performed by each module based on the timing bar chart. The method also includes the step of combining the models of the modules to obtain a system model having a first control-flow structure which represents the control logic for use in the manufacturing system.

A system is also provided for carrying out the above-noted method steps.

Still further in carrying out the above objects and other objects of the present invention, a reconfigurable logic controller for controlling a plurality of modules in a manufacturing system is provided. The logic controller includes reconfigurable control logic programs to quickly change from a first desired control logic to a second desired control logic of the logic controller. The logic controller also includes a device for running the control logic programs to control various sequential operations to be performed on a part by the modules of the system. The control logic programs are modular to permit rapid and reliable integration of the control logic programs during a change in the control logic so that the controller will have the second desired control logic.

Yet still further in carrying out the above objects and other objects of the present invention, a computer-implemented method for designing the above-noted reconfigurable logic controller to have the first desired control logic is provided. The method includes the steps of providing a timing bar chart which describes various sequential operations to be performed on a part by the modules of the system and providing a programmed computer to: generate a model of the sequential operations to be performed by each module based on the timing bar chart; and combine the models of the modules to obtain a system model having a first control-flow structure which represents the first desired control logic for use in the logic controller.

Still further in carrying out the above objects and other objects of the present invention, a computer-implemented method for changing the control logic of the reconfigurable logic controller is provided. The method includes the steps of determining if it is desirable to reconfigure the control logic of the logic controller and, if it is desirable to reconfigure the control logic of the logic controller, reconfiguring the control logic programs to have the second desired control logic.

The method and systems of the present invention provide a systematic and easy way to verify and implement the algorithms of logic controllers using the Petri nets and Sequential Function Chart, SFC (Grafcet). The starting point is the so-called timing bar chart of a high volume transfer line which is a very commonly used way of describing the various sequential operations in the transfer line. A key idea is to start from the timing bar chart and create a modular representation of control logic using Petri nets. Each station is considered as a module and Petri nets for each module are generated first. The modified reduction rule and the locality property are utilized to compose the logic of each Petri net module and construct the control logic of the whole system. The liveness, safeness and reversibility of the system Petri net can be easily verified using the properties of marked graphs (which is a subclass of Petri nets). Using the fact that a live and safe marked graph is equivalent to SFC, the system Petri net can be transformed into SFC directly.

Previously, some work has been done using Petri nets to design logic controllers for manufacturing systems, but it seems that this approach is not yet much utilized in the machining industry. This is due in part to the fact that the methodologies are not simple, and they require specialized knowledge about Petri nets. A marked graph is considered here for simplicity instead of a general Petri net. Also, it appears to provide sufficient power and versatility to cover large classes of machining systems. The designed logic can be implemented in several ways such as ladder logic, Sequential Function Chart, and general programming languages. The Sequential Function Chart (or Grafcet), which is one of the IEC 1131-3 standard languages for the Progranmmable Logic Controller (PLC), is considered here for implementation of the logic controller.

This work is partly motivated by the needs of the emerging class of machining systems called reconfigurable machining systems. In this context, the logic controllers often need to be modified due to product part changes or process changes or machining systems changes. It is important to be able to rapidly redesign and implement such logic controllers in response to mechanical reconfiguration of the machining system. In this case, an important issue is the reconfigurability of the logic controller with maximal re-use of existing algorithms. The modular logic controller approach which is described herein can be a solution for such reconfigurable logic controllers. The distributed or decentralized logic controller is a main idea for a reconfigurable logic controller and this can be also achieved by the modular approach taken here.

The above objects and other objects, features and advantages of the present invention are readily apparent from the following detailed description of the best mode for carrying out the invention when taken in connection with the accompanying drawings.

BRIEF DESCRIPTION OF DRAWINGS

FIGS. 3a–3d are graphical flow charts marking evolution of an ordinary Petri net wherein FIG. 3a is initial marking; FIG. 3b is firing transition t1; FIG. 3c is firing transition t2; and FIG. 3d is firing transition t3;

FIGS. 4a–4c are graphical flow charts which illustrate some modeling capabilities of Petri nets wherein FIG. 4a represents conflict: if t1 fires, t2 is not enabled and visa versa; FIG. 4b represents concurrency: t1 and t2 can be fired independently; and FIG. 4c represents synchronization: t1 synchronize p1, p2 and p3;

FIGS. 5a–5d are graphical flow charts which illustrate the hierarchical representation of a Petri net wherein the original Petri net is shown in FIG. 5a, the first hierarchical reduction; FIG. 5b uses a double circle place to encapsulate the right branch of the Petri net; in FIG. 5c, the internal structure of the double circle is shown with the original places p1 and p4 with the box transition as another hierarchical level; the internal structure of the box transition is shown in FIG. 5d with the original places p2 and p3;

FIG. 6 is a graphical flow chart illustrating modular construction of a Petri net: synchronization of operations;

FIGS. 7A–7C are graphical charts illustrating simple reductions which preserve liveness, safeness (or boundedness), and reversibility; wherein FIG. 7a shows fusion of series places; FIG. 7b shows fusion of series transitions; and FIG. 7c shows fusion of parallel places;

FIG. 8 is a schematic block diagram of a high volume transfer line;

FIG. 9 is a timing bar chart of a part of the system of FIG. 8;

FIGS. 10a–10c illustrate Petri net construction of the transfer bar module of the system wherein FIG. 10a shows a timing bar chart of the transfer bar module; FIG. 10b shows a Petri net of the transfer bar module; and FIG. 10c shows a simplified Petri net from the modified reduction rule;

FIGS. 11a–11d illustrate Petri net models of the modules in the timing bar chart of FIG. 9 wherein FIG. 11a is for the cradle module; FIG. 11b is for the clamp module; FIG. 11c is for the mill 1 module; and FIG. 11d is for the mill 2 module;

FIGS. 12a–12e illustrate simplified Petri nets for the above modules wherein a modified reduction rule is applied to the original Petri net modules;

BEST MODE FOR CARRYING OUT THE INVENTION

Figure 1:
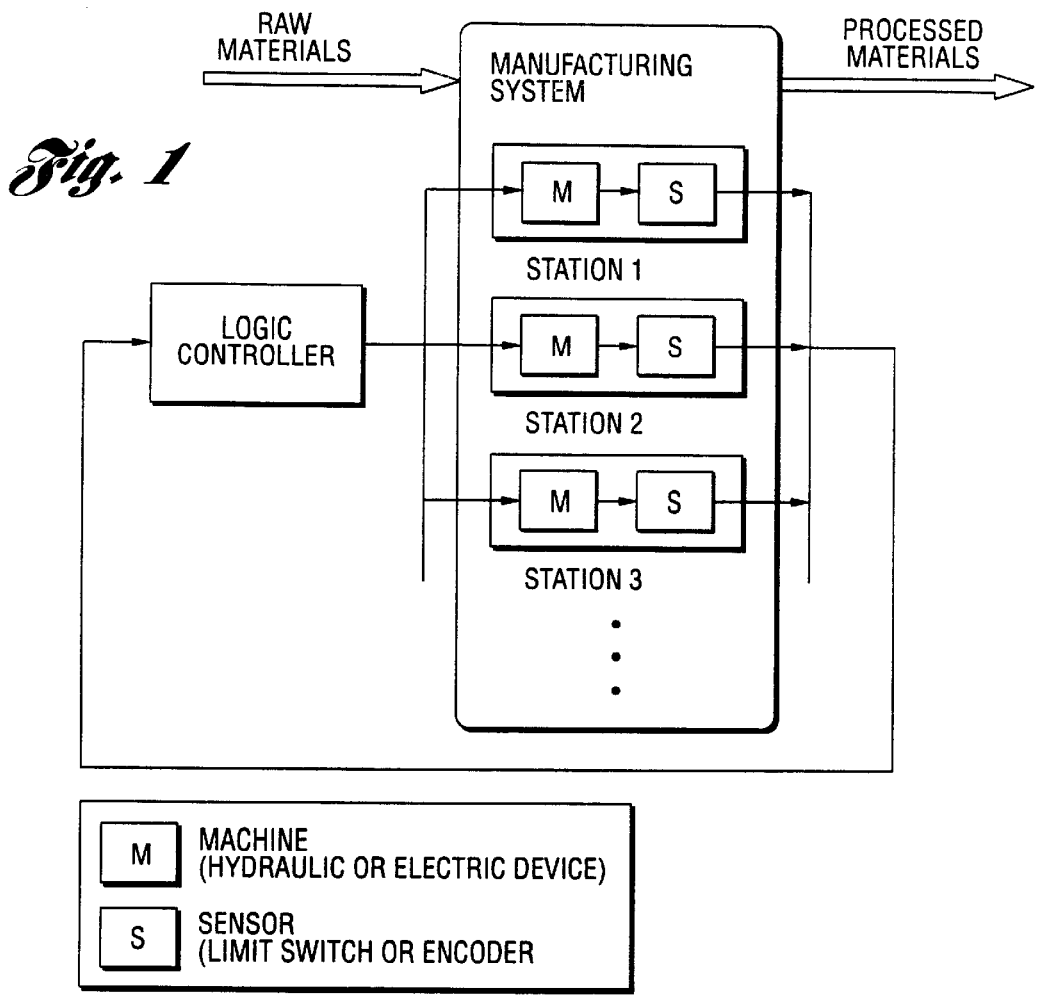
FIG. 1 is a schematic diagram of a manufacturing system and reconfigurable logic controller constructed in accordance with the present invention.
Figure 2:
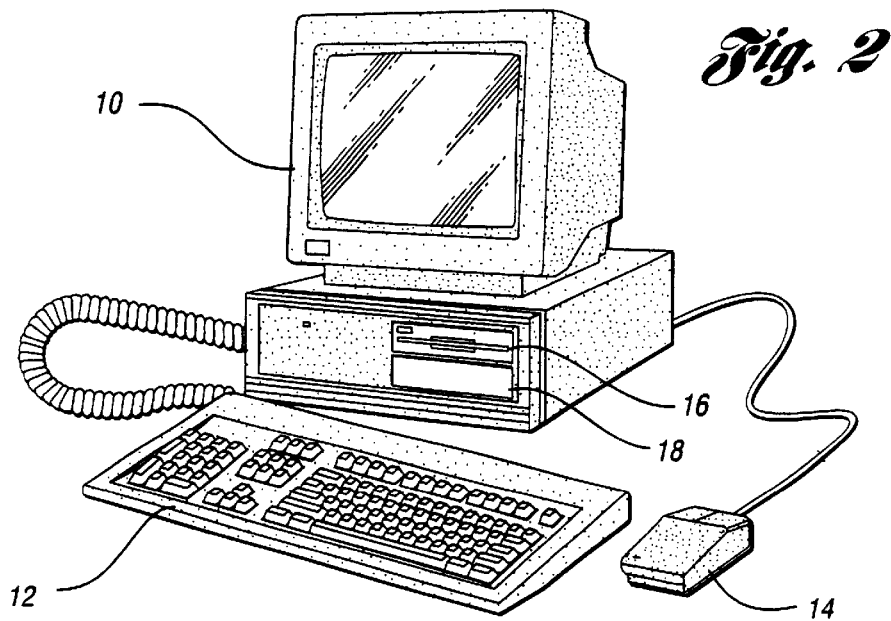
FIG. 2 is a schematic diagram illustrating a preferred hardware configuration on which the methods of the present invention can be implemented.

Referring again to the drawing figures, there is illustrated in FIG. 2 a workstation on which the methods and systems of the present invention can be implemented. The hardware illustrated in FIG. 1 includes a monitor 10 such as a single SVGA display, a keyboard 12, a pointing device such as a mouse 14, a magnetic storage device 16, and a chassis 18 including a CPU and random access memory. In a preferred embodiment, the chassis 18 is a Pentium-based IBM compatible PC or other PC having at least 8 megabytes of RAM and at least 12 megabytes of hard disk space.

The hardware configuration also includes the development environment of a graphical programming tool such as Petri nets and of a high-level, graphic, flow-control language such as SFC for pictorially specifying the structure and detailed interaction of a system of concurrent processes.

Referring again to FIG. 1, the manufacturing system illustrated therein has several stations which work together to perform operations (milling, drilling, etc.) on a part. The logic controller coordinates the sequence of operations. Its inputs are signals generated by sensors at each station and its outputs are Boolean control signals for the machines.

Ordinary Petri nets are described herein because most machining systems can be modeled by ordinary Petri nets and the general ideas for ordinary Petri nets can be extended for non-ordinary Petri nets quite easily. The use of Petri nets in modeling manufacturing systems has several practical features. It can easily model causal dependencies, conflicts, synchronization, mutual exclusion and concurrency. Some modeling capabilities are shown in FIGS. 4a–4c.

Petri nets also have a locality property on places and transitions which enables hierarchical and modular constructions of complicated systems. The synthesis of a Petri net model is made easier due to this property and the several methods for such synthesis are explained in the prior art. A hierarchical representation of a Petri net and a modular way of constructing a Petri net are shown in FIGS. 5a–5d and FIG. 6. In FIG. 6, the operation p2 in the module 1 and the operation p6 in the module 2 are synchronized by combining two transitions t1 and t3. Likewise, the operation p1, p7, and p8 are synchronized by the combined transition (t2 and t4). Waiting places are necessary for precise representation of the state of the combined system.

The system considered here is a high volume transfer line and its logic controller. Generally, high volume transfer lines are characterized by synchronizations, concurrencies, and their cyclic behaviors. Places and transitions can be interpreted in various ways depending on the modeled system. The operations or the conditions are represented by places and the completions of operations are modeled by transitions and the detailed explanations will be described hereinbelow.

Analysis of Petri Nets Models

The qualitative properties which are especially important in Petri net models for logic controllers are liveness, safeness, and reversibility. The definitions of these properties are available in many prior art references. Their general meaning in logic controllers in manufacturing systems can be summarized as follows:

1. Safeness guarantees the stable behavior of the system without any overflow. The safeness property of the places which represent the operations indicates that there is no attempt to request execution of ongoing operations. Another important implication of safeness is its Boolean representation of places and this enables a direct conversion from a Petri net to Sequential Function Chart.

2. Liveness as considered in this paper means the absence of deadlocks. This property guarantees that all places can be firable and it ensures the operations or the conditions which are modeled by places can happen in its evolution of process.

3. Reversibility implies the cyclic behavior of a system that performs its function repeatedly and characterizes the recoverability of the initial state from any states (in the controlled behavior) of the system.

The analysis of Petri net models of logic controllers may be used to verify the boundedness, liveness and reversibility properties to guarantee the desired behaviors of the manufacturing systems. There are three approaches in the analysis of the qualitative properties of Petri nets models: analysis by enumeration, analysis using linear algebraic techniques, and analysis by transformation. Enumeration methods are based on the construction of the reachability graph or the coverability graph. The state transition equation and invariant concepts are used in the linear algebraic approach. The analysis by transformation is based on simple reduction rules which preserve the properties (safeness, liveness and reversibility) of Petri nets. The transformation procedure is iterative and applies the reduction rules until the reduced Petri nets become irreducible. Generally, the tractability of the first two techniques is limited by the complexity of the systems and the reduced Petri nets are irreducible but sometimes are "not-simple" to analyze and one may need to apply other techniques. These techniques are complementary and not exclusive. The details of these techniques can be found in the prior art. Some simple reduction rules are utilized to develop a modified reduction rule for combining the modules of the system.

Simple Reduction Rules

In FIG. 6, some of the simple reduction rules which are used in the next section are presented graphically. These reduction rules preserve the properties of liveness, safeness (or boundedness), and reversibility.

A Modified Reduction Rule

A modified reduction rule is developed for a composition of Petri nets of modules of a system and a representation of the cyclic behavior of high volume transfer lines. There are two basic ideas in this rule. First, keep transitions of each module which are related to transitions of other modules. Another idea is to keep the initial operation and the last transition of a Petri net to represent clearly the cyclic behavior of the system. Then, reduce the Petri nets using the simple reduction rules, and with these transitions, the Petri net of each module can be combined into one system Petri net; the details will be explained in the next section.

Classification of Petri Nets Models

Petri nets models can be categorized into several subclasses by their structural characteristics. Analysis techniques are well developed for some subclasses of Petri nets and the properties of Petri net models can easily be verified using these powerful structural results. The high volume transfer line manufacturing system which is considered here can be represented by the marked graph (MG) which is one of the subclasses of Petri nets and its formal definition is given in Definition 6.

Definition 6.

A marked graph (MG) is an ordinary Petri net such that each place p has exactly one input arc and exactly one output arc.

Definition 7.

A Petri net is strongly connected if there exists a directed path from every place (transition) to every transition (place).

Marked graphs basically model decision-free (or no conflict) concurrent systems and the properties of marked graphs can be easily verified by the following theorems:

Theorem 1.

A marked graph (MG, $M_0$) is live if $M_0$ places at least one token on each directed circuit in MG.

Theorem 2.

A live marked graph (MG, $M_0$) is safe if every place belongs to a directed circuit C with $M_0(C)=1$.

Theorem 3.

There exists a live and safe marking in a marked graph if the marked graph is strongly connected.

Theorem 4.

A strongly connected marked graph is reversible iff it is live. Therefore, liveness is equivalent to reversibility for strongly connected marked graphs.

Therefore, the verification procedure of safeness, liveness and reversibility properties of Petri nets of manufacturing systems can be simplified if one can model the system using one of subclasses of Petri nets in which structural behaviors are well understood; for example, the marked graph as described herein.

Sequential Function Chart

Sequential Function Chart (SFC) is one of the IEC 1131-3 languages for logic controllers. It is based on Grafcet which was inspired from Petri nets. The structure of Sequential Function Chart is well explained with other standard languages for logic controllers in the prior art and is frequently used in the industries with the ladder diagram. A description of the Grafcet as a powerful tool for the programmable logic controller (PLC) can be found in the prior art. Sequential Function Chart is used as an implementation of the designed logic controller because it can be directly generated from the marked graph and it also has an hierarchical and modular structures like Petri nets.

Grafcet has two types of nodes, i.e., steps and transitions instead of places and transitions in Petri nets. Steps are represented by squares (instead of circles in Petri nets) and initial steps are represented by a double square. There are two main differences between the Petri nets and Grafcet. First, the steps in Grafcet can have only one token but the places in Petri nets can have many. In other words, the marking of step is a Boolean representation whereas the marking of place is a numerical representation. The second difference is the firing rule in conflict. In a Grafcet, all the simultaneously firable transitions are simultaneously firable but only one of them can be firable in Petri nets. Those two differences can be removed if one considers the safe marked graph because the marked graph has no conflicts in its structure and safeness guarantees the Boolean representation of places. In other words, the safe marked graph can be easily converted to Grafcet (or Sequential Function Chart) and its graphical conversion methods will be illustrated in the next section.

Generatng a Logic Controller Using Petri Net Formalism

One can use the Petri net and related concepts to come up with a systematic and formal procedure to generate logic controllers from timing bar charts. It is best to do this via a representative example instead of an abstract description. What follows is an example of the proposed formal procedure for constructing the control algorithm of the logic controller from the timing bar chart of a high volume transfer line. The system which is considered here is an engine block surface milling transfer line. Generally high volume transfer lines are composed of machining centers, transfer mechanisms and fixture mechanisms.

System Configuration

The system is composed of four milling machines, transfer mechanisms and several fixture mechanisms and it is shown in FIG. 8. The numbered squares represent the locations of the engine blocks. The clamp mechanisms are fixtures for the milling machines and the cradle mechanism is for preventing the interference between the mill 2 and the engine block in number 2 location. The transfer bar mechanism moves each engine block to next location in each cycle motion. The milling machines start to work after the engine blocks are located properly by the transfer bar mechanism, the cradle mechanism and the clamp mechanism. The logic controller for this system controls causal dependencies, concurrencies, synchronizations of the sequences and cyclic behavior of the process. A part of the system which is represented by the dotted box in FIG. 8 and its timing bar chart which is shown in FIG. 9 are considered for simplicity but the concepts developed for this part can be extended to the whole system without any difficulty. In FIG. 9, GPM means Gallon Per Minutes for the hydraulic devices and dotted arrow represents the synchronized operations.

Construction of Petri Nets From the Timing Bar Chart

Step 1. Construct the Petri Net for Each Module.

Generally, the operations of each module in the timing bar chart appear in chronological order of one cycle period. Petri nets of modules are started from the initial operation of the beginning of the cycle. The operations are represented by places (circles) and the completion of the operations are considered as transitions (bars) of Petri net. The initial operation of each module is represented by the circle with a token. If two operations have some time interval, put one dummy place between two operations and consider as a waiting place, W. Using these dummy places, the events which happen between two operations can be easily considered. The transfer bar module is considered as an example and the timing bar chart, the Petri net of the module, and the simplified Petri net are shown in FIGS. 10a–10c.

In FIGS. 10a–10c, the rules of FIGS. 7c–7a are followed. Numbered transitions are not eliminated because these will be needed when the modules are combined later. Each operation is a place (circle) with the completion of the operation represented by a transition (bar). Two waiting places (W) are added to represent the wait time associate with Return Transfer complete and 4th Lower complete. Transitions which are common or dependent on other modules are numbered for reference. The Operations "2nd Lift", "3rd Lift", "4th Lift" and "Advance Transfer" are reduced by the double circle A.

In this module, there is no operation at the beginning of the cycle, i.e., at time 0 in the timing bar chart. A waiting place, "RT (Return Transfer) completed" in FIG. 10b, is put to represent this. There are some operations which are affected by other operations and the starting of these operations are represented by the dotted arrow in the timing bar chart. The numbered transitions in the Petri net represent completions of these operations and the meaning of the number will be explained later. For example, the operation "Cycle load Automation" can be started after finishing the operation "Advance Transfer". Actually, the "Advance Transfer" operation is followed by two concurrent operations, "Cycle load Operation" and "1st Lower". This concurrency is represented in the Petri net.

The resulting Petri net for the transfer bar module can be constructed as shown in FIG. 10b. Using the modified reduction rule, the simplified Petri net for this module is constructed as shown in FIG. 10c. The double circle which is often called macro place is a hierarchical representation of several operations. The operations "2nd Lift", "3rd Lift", "4th Lift" and "Advance Transfer" are reduced by the double circle A in FIG. 10c. In this reduction, one can keep the physical meanings of the transition. For example, the transition 3 in FIG. 10c still implies the completion of the "Advance Transfer" operation like FIG. 10b. The Petri nets for the other modules of the system are shown in FIGS. 11a–11d. The transitions which will be kept in the reduction process are shown by numbered thick bars.

The simplified Petri nets of the modules in the system are shown in FIGS. 12a–12c. In these Petri nets, the transitions can be numbered in chronological order because the physical meaning of the transitions are kept through the reduction process. The transition 6 and 7 in the mill modules are for explicit representation of the cyclic behavior of the machining process.

Step 2. Construct the Petri Net For The System.

From step 1, the simplified Petri nets for the each module of the system are built by the modified reduction rule described above and are shown in FIGS. 12a–12c. The transitions in the simplified Petri nets were numbered in chronological order using the timing bar chart. Using these numbered transitions, a Petri net for the system can be constructed easily. The transitions with same number in the simplified Petri nets imply that they should be synchronized. To construct the Petri net for the system, first one draws the numbered transitions and locates the places appropriately.

Figures 13, 14:
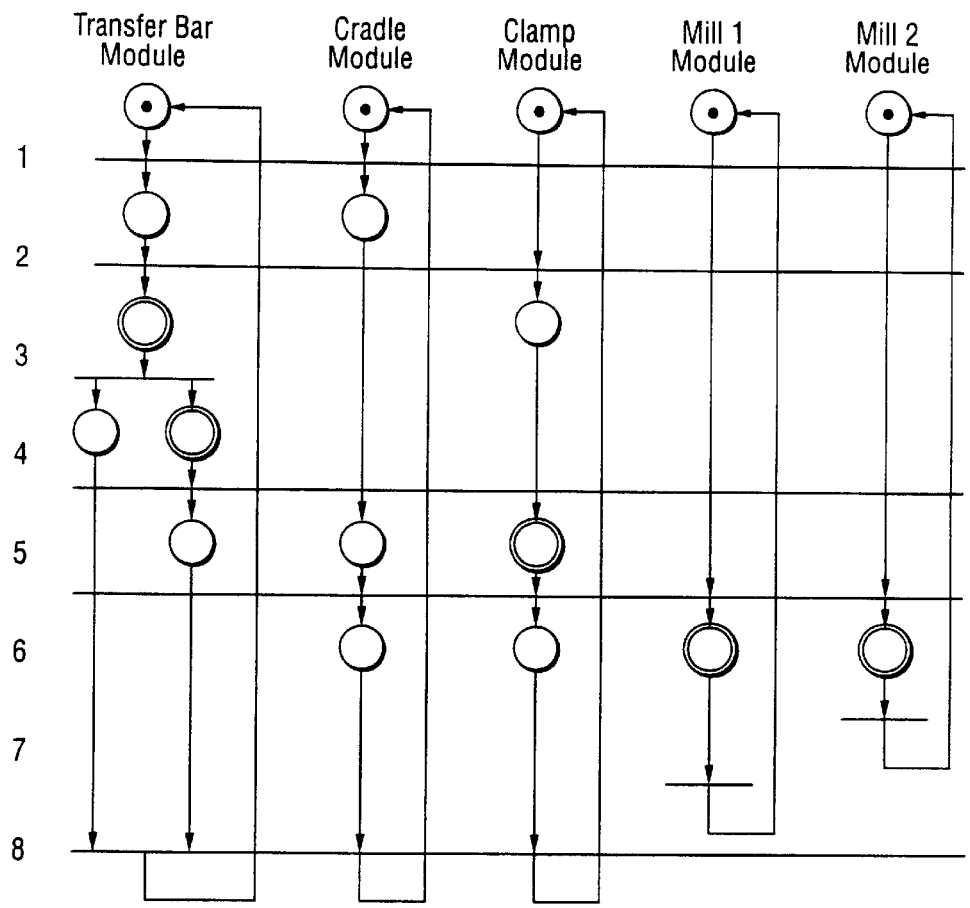
FIG. 13 is a Petri net of the system logic controller in simplified form.
FIG. 14 is a table which illustrates the conversion rules between the marked graph and SFC.

The meaning of the transitions are summarized in Table 1. A transition just after a waiting place has no physical meaning and implies the operation after the transition can be started by the other transitions which have the same number. The Petri net for the complete system is shown in FIG. 13. The system Petri net has a hierarchical structure which is indicated by the double circled places.

TABLE 1

| Transitions | Physical Events |
| --- | --- |
| 1 | Complete "return cradle" operations |
| 2 | Complete "1st lift" and "return clamp" operations |
| 3 | Complete "advance transfer" operation |
| 4 | Complete "4th lower" |
| 5 | Complete "advance cradle" and "advance clamp" and "air check"and "reset main slide (mill 1)" and "reset mail slide (mill 2)" operations |
| 6 | Complete "rapid return main slide (mill 2)" operation |
| 7 | Complete "decel (mill 1)" operation |
| 8 | Complete "cycle load automation" and "return transfer" operations |

Verify the Properties of the Petri Net of the System Logic Controller

The system Petri net in FIG. 13 is a marked graph because the macro places (double circles) have marked graphs inside them. By the fact that the simple reduction rule keeps the liveness, safeness and reversibility properties, we can verify the properties of the Petri net using this simplified form. Each module in the Petri net in FIG. 13 turns out to be a directed circuit. Therefore, using the theorems in the previous section, one can easily verify the liveness, safeness and reversibility properties of the Petri net in simplified form. It guarantees that the Petri net of the system logic controller has the same characteristics.

Convert the Petri Net into SFC

Figure 15:
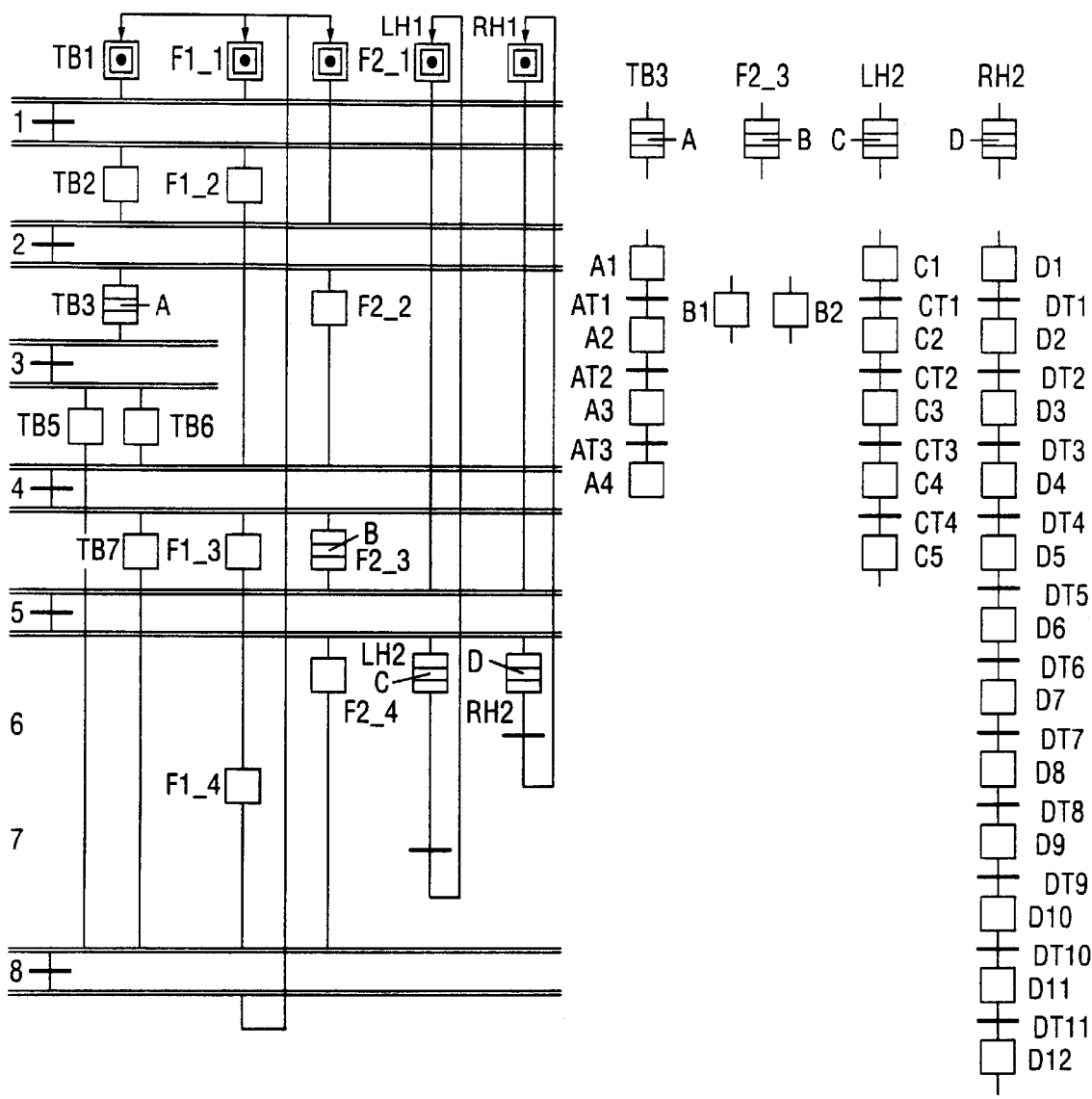
FIG. 15 illustrates an SFC implementation of the logic controller.

Sequential Function Chart is considered to implement the control logic which was built by the Petri net. SFC is chosen because a live and safe marked graph can be converted directly into SFC and it is a standard language especially for PLC (Programmable Logic Controller). The one-to-one conversion methods are graphically summarized in FIG. 14 and the SFC representation of the control logic is shown in FIG. 13. From this SFC, one can implement the control algorithm for the logic controller of the considered system. The meanings of all steps and transitions in FIG. 15 can be found from FIGS. 10a–10c, 11a–11d and 13.

Modification and Reconfiguration of a Logic Controller

The modular concept which was developed in the previous section is utilized in some applications. The module defined herein is a unit of machines in the system such as the transfer bar module, the clamp module, the mill 1 module, etc. Using this modular concept, an implementation method of the logic controller algorithm for the part of system is derived. In this section, the method to include the other modules in the system, the concept for the decentralized logic controller, and the reconfigurability of the control logic will be explained.

Generalization of the Algorithm

For simplicity, a logic controller algorithm was built only for a part of the system in the previous section. The algorithm can be changed by the mill 4 module and the clamp module for this milling machine. This clamp module is different from the clamp module for the mill 1 and mill 2 modules.

Figure 16:
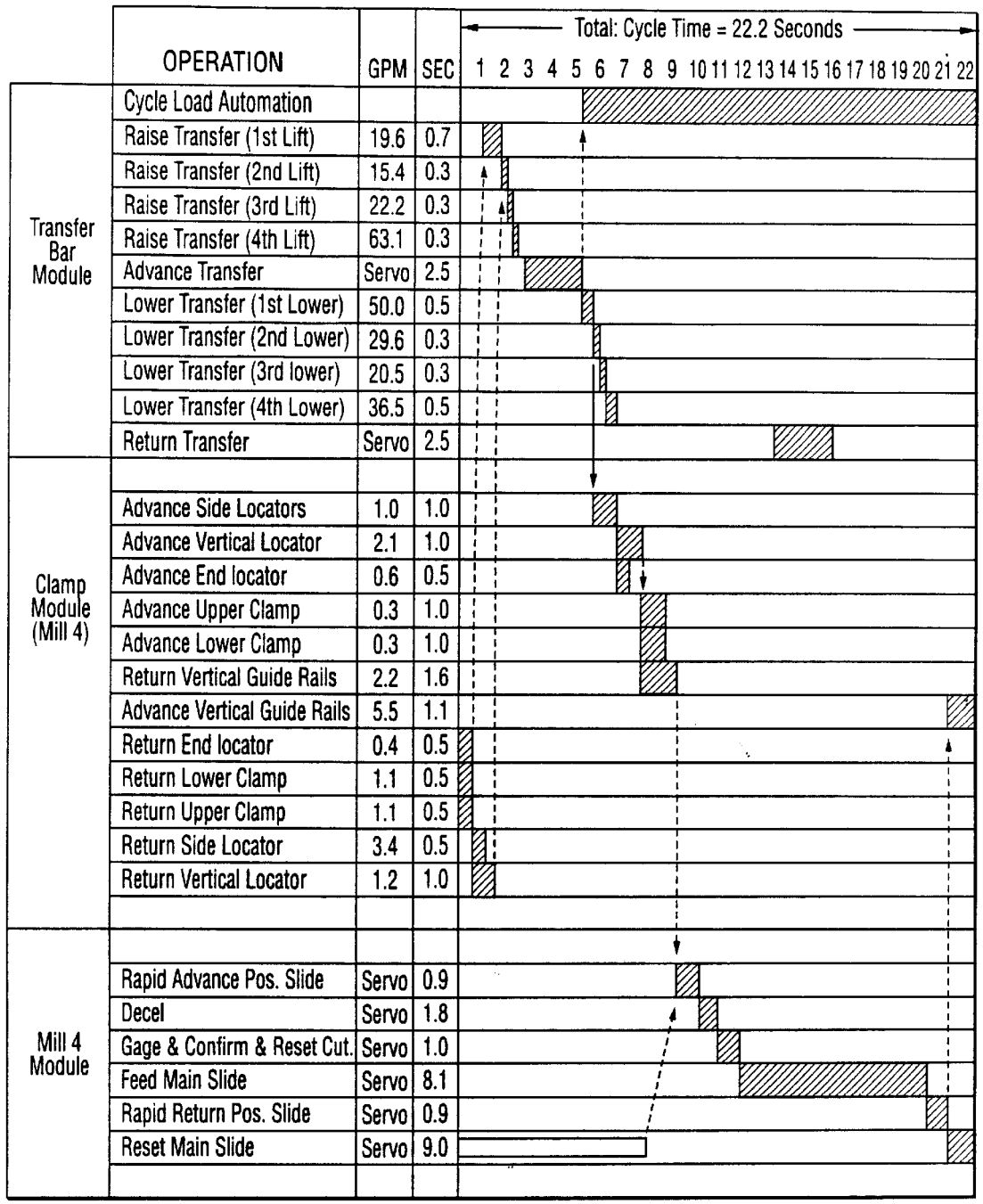
FIG. 16 is a timing bar chart for the mill 4 and the clamp module with the transfer bar module.

The timing bar chart for the mill 4 and its clamp modules with the transfer bar module is shown in FIG. 16. From this timing bar chart one can find that the "2nd Lower" operation of transfer bar module should be synchronized by the operation "Advance Side Locator" of the clamp module (which is shown by the solid arrow in FIG. 16) in addition to "1st Lift" and "2nd Lift" operations which were considered already. The simplified Petri net for the transfer bar module needs to be modified to reflect this operation.

Figure 17A:
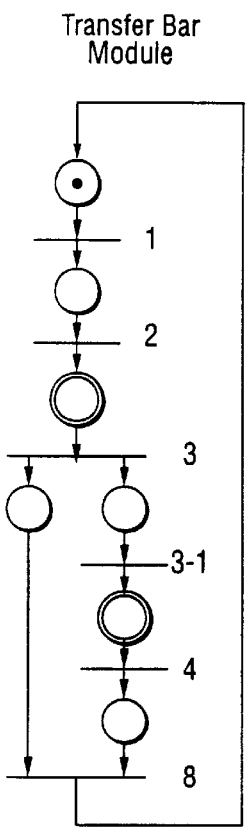
FIGS. 17a–17c illustrate new simplified Petri nets for the expansion of the mill 4 module.
Figure 17B:
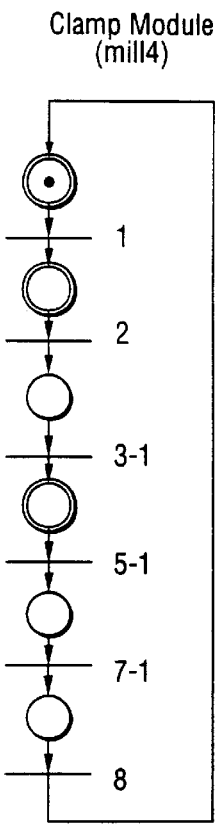
Figure 17C:
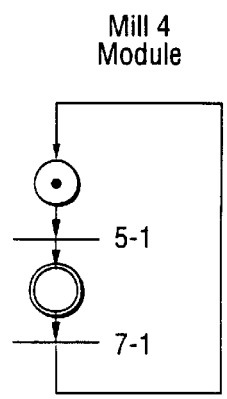

Simplified Petri nets for the modified transfer bar module, the mill 4 module, and the mill 4 clamp module are shown in FIGS. 17a–17c. Numbers for the new transitions were given by 3-1, 5-1, and 7-1 to represent chronological orders. In other words, the transition 3-1 simply means that it occurs after the transition 3.

Figure 18:
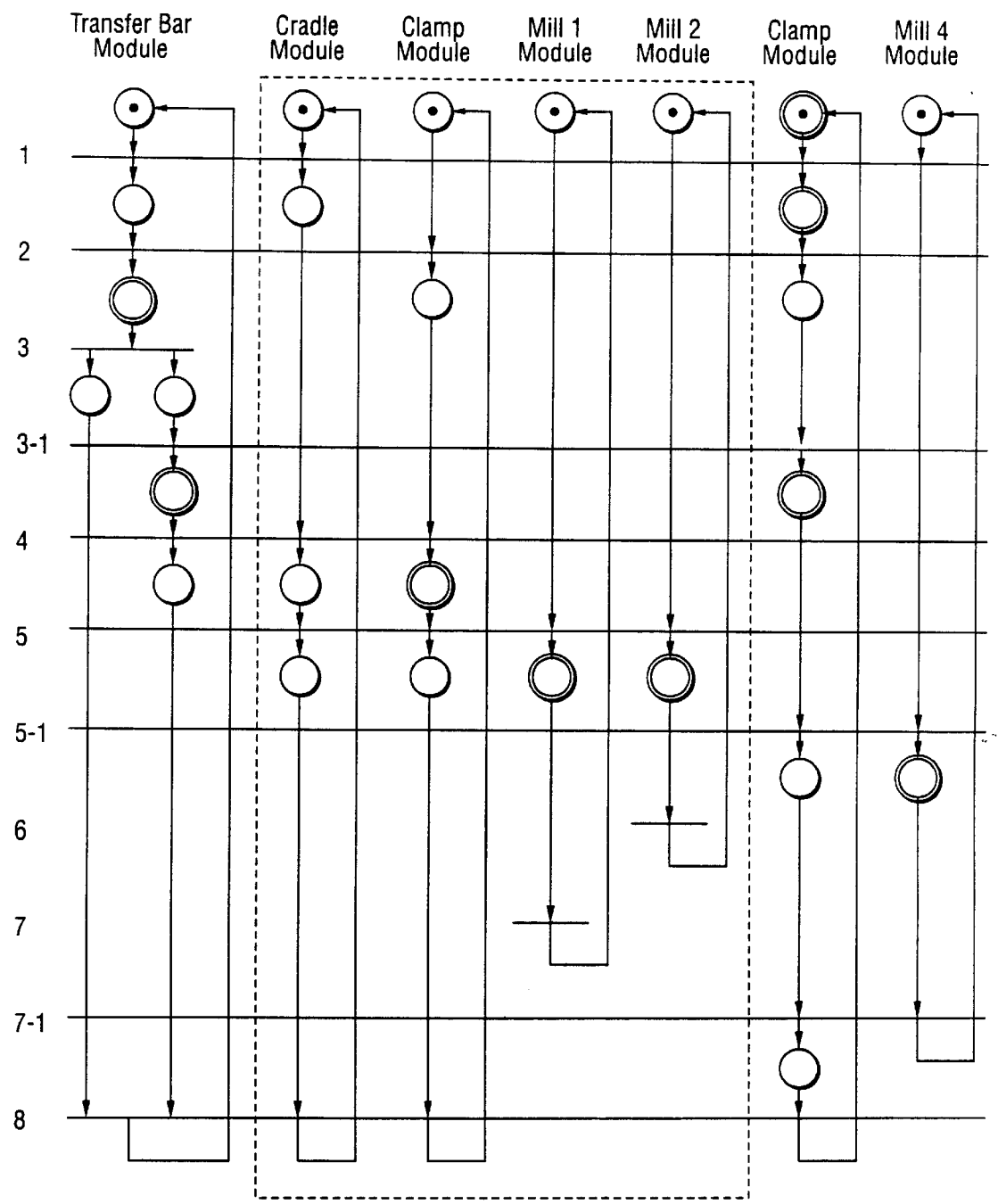
FIG. 18 illustrates a Petri net of the new system logic controller.

Using these new simplified Petri nets, one can build the Petri net for the logic controller of the system which includes another mill and clamp modules and it is shown in FIG. 18. The Petri net inside the dotted square indicates the portion Petri net (and hence the Grafcet logic) that does not need to be changed in response to the addiction of mill 4. New joint transitions need to be added. These are denoted by 3-1, 5-1, and 7-1. Even though the mill 4 module and the other clamp module are included in the system logic controller, one does not need to modify the logic for the mill 1, the mill 2, the cradle, and the clamp modules (which is represented by dotted box in FIG. 18). This is a very useful aspect of the modular representation and it is mentioned again below. The new Petri net is still a live and safe marked graph so the algoritlhn for the logic controller can be implemented directly by SFC as in FIG. 15.

Reconfigurable High Volume Transfer Line

Sometimes a high volume transfer line needs to be modified due to product part changes and process changes. To react to these situations, the increased flexibility to quickly accommodate part changes with maximum re-use of machining components is necessary. A modular concept for designing a logic controller algorithm of a high volume transfer line was proposed in the previous section and this concept was applied to the extension of the system logic controller described hereinabove.

Generally, the reconfigurability of the system results from the mechanical reconfigurability of the component machines. However, for a reconfigurable machining system, the logic controller for the system also should be reconfigurable. This is facilitated by having a modular representation for the component machines. A decentralized or a distributed logic controller is considered for reconfigurable logic controllers. The modular units which are considered herein can be appropriate for designing a reconfigurable system. The structure of the modular units for the system which is considered in here is shown in FIG. 19.

Figure 19:
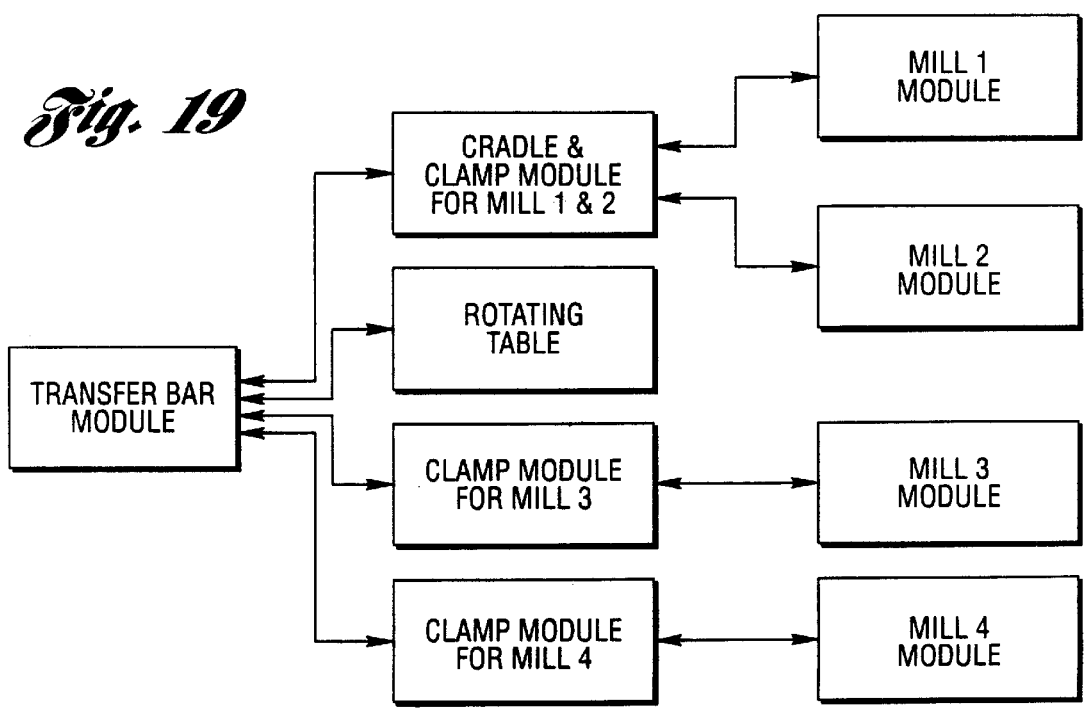
FIG. 19 is a schematic block diagram illustrating the structure of the modules in the system logic controller.

In FIG. 19, the logic controller for the transfer bar module is related to the logic controllers of fixture mechanisms only and the fixture logic is related to the mill logic. Each module can be considered a directed circuit in the Petri net representation of the system logic controller. If the modified system uses the same transfer bar module, the algorithm for the logic controller can be re-configured easily.

For example, if the modified system should use a drill machine instead of the mill 4 module but the same clamp module, one just removes the mill 4 module in FIG. 18 and puts a new simplified Petri net in for the drilling machine. The mechanism motions of the drilling machine are different from the motions of the milling machine but if the relations with the clamp module are the same, the simplified Petri nets of two modules can be represented by the same Petri net.

The other parts of the Petri net are used in the new control algorithm. The algorithm can be reconfigured with maximum re-use of the old algorithm. Any modifications in modules except the transfer bar module can be easily re-configured if one uses the method which is introduced herein. In fact, the re-configuration of the logic controller is the same as the extension procedure of the algorithm described hereinabove.

Reconfigurable Controllers

Reconfigurable machines must be designed to be reconfigurable in terms of their communications and control functions, as well as their mechanical motion and material processing functions. This requires plug and play hardware and software modules, based on real-time open-architecture principles [Koren et al 1996]. For example, an existing servo control module for axis motion control might be upgraded to include a superior algorithm that includes friction compensation. Such a change can improve the quality of the machined part, thus, making the machine with the new controller suitable for a new product that has higher quality requirements.

Changes in control algorithms must be accomplished without interfering with other control modules (e.g., interpolator, force controller, error compensation) and without compromising the quality and productivity of the machine due to changes in the sampling rates. This requires a software architecture that supports modularity and real-time constraints, and can map the control functions to one or more processors as needed. For example, a modular, multi-processor architecture can be used. A first processor can be used for man-machine interactions and the operator interface. A second processor can handle motion (or servo) control functions, and a third processor can handle process control functions such as force control.

Just like reconfigurable machines are modular, so is the reconfigurable controller. This leads to the concept of reusable software assets which can be developed and also stored in a library for reuse.

In addition to the definition of software modules, and their storage in a library for reuse, it is necessary to have software tools for their integration. Such a software tool can be termed a control configurator, and is a visual, or graphical, programming environment where the control software modules can be assembled into a complete software package, tested in simulation, then downloaded to the reconfigurable controller for actual implementation. It is also necessary to support system level reconfiguration by enabling engineers to rapidly modify the discrete-event logic that coordinates and controls the sequence of operations that occur as a product moves through a production line. This can be accomplished in a manner similar to the reusable software assets concept described above. However, in this case the software assets are discrete-event control logic modules in a standard format (e.g. Petri nets or Grafcet).

As described above, a logic controller for a high volume transfer line can be represented by the Petri nets. The hierarchical and modular characteristics of Petri nets enable a modular representation of the logic controller. The control logic for the whole system can be simplified by a modified reduction rule which preserves the joint transitions. The properties of the logic controller such as safeness, liveness, and reversibility are easily verified using characteristics of marked graphs. Using a safe and live marked graph, the logic controller is implemented by a Sequential Function Chart (which is one of the IEC 1131-3 languages). A significant result is that this modular approach for the logic controller can be used directly in the construction of reconfigurable machining system controllers.

While the best mode for carrying out the invention has been described in detail, those familiar with the art to which this invention relates will recognize various alternative designs and embodiments for practicing the invention as defined by the following claims.

What is claimed is:

1. A method for creating a control-flow structure which represents control logic for use in a manufacturing system having a plurality of modules, the method comprising the steps of:

providing a timing bar chart which describes various sequential operations to be performed on a part by the modules of the system;

generating a Petri net model of the sequential operations to be performed by each module based on the timing bar chart; and combining the models of the modules to obtain a system Petri net model having a first control-flow structure which represents the control logic for use in the manufacturing system wherein the system Petri net model also has qualitative properties which can be analyzed wherein each of the Petri net models includes at least one operation and wherein the step of combining includes the step of synchronizing the operations of the Petri net models.

2. The method as claimed in claim 1 wherein at least one of the models has liveness and safeness and wherein the method further comprises the step of reducing the at least one of the models to form a simplified model which maintains the liveness and safeness of the at least one model and wherein the step of combining combines the simplified model to obtain the system model.

3. The method as claimed in claim 2 wherein the first control-flow structure is a live and safe marked graph.

4. The method as claimed in claim 3 further comprising the step of generating a second control-flow structure based on the live and safe marked graph.

5. The method as claimed in claim 4 further comprising the step of generating control logic programs based on the second control-flow structure.

6. The method as claimed in claim 4 wherein the second control-flow structure comprises sequential function charts.

7. The method as claimed in claim 4 wherein the step of generating the second control-flow structure implements a one-to-one conversion between the second control-flow structure and the live and safe marked graph.

8. The method as claimed in claim 1 wherein each of the Petri net models includes at least one transition and wherein the step of synchronizing includes the step of combining transitions in the Petri net models.

9. The method as claimed in claim 1 wherein the first control-flow structure is a graphical control-flow structure.

10. The method as claimed in claim 1 wherein the manufacturing system is a machining system and wherein the plurality of modules includes at least one machining module.

11. The method as claimed in claim 10 wherein the machining system is a transfer line and wherein the plurality of modules includes a transfer bar module.

12. The method as claimed in claim 11 wherein the plurality of modules includes at least one fixture module.

13. The method as claimed in claim 1 wherein each of the models is a finite state machine model and wherein the system model is a system finite state machine model.

14. A computerized system for creating a control-flow structure which represents control logic for use in a manufacturing system having a plurality of modules from a timing bar chart which describes various sequential operations to be performed on a part by the modules of the system, the system comprising:

means for generating a Petri net model of the sequential operations to be performed by each module based on the timing bar chart; and means for combining the models of the modules to obtain a system Petri net model having a first control-flow structure which represents the control logic for use in the manufacturing system wherein the Petri net system model also has qualitative properties which can be analyzed wherein each of the Petri net models includes at least one operation and wherein the mean for combining includes means for synchronizing the operations of the Petri net models.

15. The system as claimed in claim 14 wherein at least one of the models has liveness and safeness and wherein the system further comprises means for reducing the at least one of the models to form a simplified model which maintains the liveness and safeness of the at least one model and wherein the means for combining combines the simplified model to obtain the system model.

16. The system as claimed in claim 15 wherein the first control-flow structure is a live and safe marked graph.

17. The system as claimed in claim 16 further comprising means for generating a second control-flow structure based on the live and safe marked graph.

18. The system as claimed in claim 17 further comprising means for generating control logic programs based on the second control-flow structure.

19. The system as claimed in claim 17 wherein the second control-flow structure comprises sequential function charts.

20. The system as claimed in claim 17 wherein the means for generating the second control-flow structure implements a one-to-one conversion between the second control-flow structure and the live and safe marked graph.

21. The system as claimed in claim 14 wherein each of the Petri net models includes at least one transition and wherein the means for synchronizing includes means for combining transitions in the Petri net models.

22. The system as claimed in claim 14 wherein the first control-flow structure is a graphical control-flow structure.

23. The system as claimed in claim 14 wherein the manufacturing system is a machining system and wherein the plurality of modules includes at least one machining module.

24. The system as claimed in claim 23 wherein the machining system is a transfer line and wherein the plurality of modules includes a transfer bar module.

25. The system as claimed in claim 24 wherein the plurality of modules includes at least one fixture module.

26. The system as claimed in claim 14 wherein each of the models is a finite state machine model and wherein the system model is a system finite state machine model.

* * * * *